United States Patent [19]

Bennett

[11] 4,216,535

[45] Aug. 5, 1980

[54] SYSTEM FOR DEPLOYING A MOORED SENSOR ARRAY

[75] Inventor: Derek J. Bennett, Thousand Oaks, Calif.

[73] Assignee: Bunker Ramo Corporation, Oak Brook, Ill.

[21] Appl. No.: 888,019

[22] Filed: Mar. 20, 1978

[51] Int. Cl.$^2$ ............ H04B 1/59

[52] U.S. Cl. ............ 367/4; 9/8 R

[58] Field of Search ............ 340/2, 8 R, 8 S, 9, 340/3 R; 9/8

[56] References Cited

U.S. PATENT DOCUMENTS

| | | | |
|---|---|---|---|
| 3,130,703 | 4/1964 | Thompson | 340/2 |
| 3,213,409 | 10/1965 | Bailey et al. | 340/2 |
| 3,336,892 | 8/1967 | Barry et al. | 9/8 X |
| 3,742,535 | 7/1973 | Horrer et al. | 9/8 R |
| 4,004,265 | 1/1977 | Woodruff et al. | 340/2 |
| 4,096,598 | 1/1978 | Mason | 9/8 R |
| 4,114,137 | 9/1978 | Mason et al. | 9/8 R |

*Primary Examiner*—Harold J. Tudor
*Attorney, Agent, or Firm*—F. M. Arbuckle; A. Frelich

[57] ABSTRACT

A system for automatically deploying a moored sensor array utilizing an elongated cylindrical container with a semispherical weighted nose which will assume a glide angle with respect to the horizontal and descend in a glide path. Cable to a surface buoy is dispensed from the container during the descent with sufficient scope (ratio of cable length to depth) to permit the surface buoy to move about in response to ocean currents without overstressing the cable. A sea anchor suspended from the buoy by an elastic member with extra length of cable between the suspended sea anchor and the buoy isolates wave motion of the buoy from the anchor on the ocean floor. Upon impact with the ocean floor, a switch in the nose of the container is closed to lock up the cable and eject an array package from the container. The array package contains buoyant material to cause it to float upwardly while paying out sensors attached along a length of cable packed in the array package.

10 Claims, 13 Drawing Figures

SYSTEM FOR DEPLOYING A MOORED SENSOR ARRAY

BACKGROUND OF THE INVENTION

This invention relates to a method and apparatus for automatically deploying a moored sensor array with a sufficient cable scope to survive the dynamic effects of waves and currents.

For hydrophone arrays deployed from surface vessels or aircraft, it is necessary that the mooring for the array be established automatically and that its cable length be adjusted for the depth of the ocean at the mooring site with sufficient scope (ratio of cable length to ocean depth) to permit ocean waves and currents to move the surface buoy about without parting the cable to the anchor below. The practice is to eject a container from a vessel or aircraft with the entire array, including the surface buoy and cable, stowed in the container. One end of the container is weighted with seawater batteries and additional ballast as necessary for the container to descend to the ocean floor. The other end of the container is closed by a deflated buoy. The cable pack and array are stowed between the batteries and the deflated buoy.

Following entry of the container into the ocean, a seawater battery is activated to fire a squib that releases compressed $CO_2$ gas into the deflated buoy. This inflates the buoy, causing it to pop out of the container and rise to the ocean surface as the container continues to descend. Connected to the bottom of the buoy is an electronic package for receiving data from the hydrophone array to be deployed, and for transmitting the hydrophone data over the air. Transmission from the array to the buoy is through the anchoring cable payed out from a cable pack as the container descends to the ocean floor. Following impact at the ocean bottom, the cable must be locked and the hydrophone array package is released from the container. The array package consists of an inverted "bucket" partly filled with buoyant material and partly filled with the hydrophone array (sensors and cable) so packed as to be payed out as the bucket ascends. Once all of the hydrophone cable has been payed out, the bucket will float above the anchoring container, thus deploying the hydrophone array in a vertical position over the container. In some missions, a horizontal array may be required. That could be accomplished by providing some way for the float to gradually decrease its buoyancy as currents near the ocean floor carry the float away from the anchoring container. Techniques for locking up the cable are disclosed in U.S. Pat. No. 4,143,349, and techniques for causing the float to gradually decrease its buoyancy in order to deploy a horizontal array are disclosed in an application by the same inventor filed concurrently herewith.

A problem of automatically deploying vertical, or horizontal, hydrophone arrays, is to provide sufficient cable scope between the surface buoy and the anchoring container. The amount of scope necessary is a function of the ocean depth and environmental forces that have to be withstood by the cable. If only enough cable is payed out to reach the floor in a calm sea, a high sea could cause the cable to part, particularly if the high sea is accompanied by strong surface currents. Methods of assuring enough scope have usually relied on the dispensing of extra cable from a separate cable pack, usually located at the buoy, but then either all of this extra cable is payed out, or some preset amount is payed out according to the depth of the mooring location. It would, of course, be preferable to pay out only a preset amount, but that does create the problem of having to preset the amount. Another problem is to automatically eject the array package from the anchoring container only after sufficient cable scope has been provided and the cable has been locked up.

SUMMARY OF THE INVENTION

In accordance with one feature of the invention, the container ejected from a vessel or aircraft is provided in the shape of a hollow cylindrical tube with a hemispherical weighted nose so that the container will descend through the water nose first with a glide angle of about 60° from the horizontal while cable connected to a surface buoy is being payed out from a pack in the container. This glide descent is usually accompanied by a helical spiral rotation induced by both body asymetries and the Coriolis force (rotation) of the earth. The glide descent causes the actual path of the container to the ocean floor to be greater than a straight descent, thereby assuring sufficient scope for the cable being payed out by the descending container.

In accordance with a further feature of the invention, impact actuated means in the container causes a sensor array package to be ejected from the container. The array package is stowed in the container on a plate held against a spring force in a stowing position deep within the container by a holding link. Impact actuated means in the container causes the link to part when the container impacts the ocean floor to release the plate which is then propelled to the open end of the container by the spring force, thus ejecting the array package. In a preferred embodiment, the link is an electrically fused wire, and the impact actuated means is comprised of a switch closed on impact to apply an electrical current to the wire. Once the array package has been ejected from the container, a float in the array package ascends and erects the hydrophone array.

DESCRIPTION OF PREFERRED EMBODIMENTS

Figure 1A:
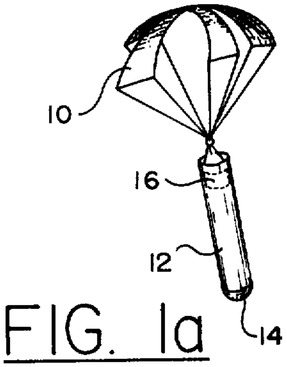
FIGS. 1a through 1f illustrate the overall deployment sequence of a hydrophone array ejected from an aircraft.
Figure 1B:
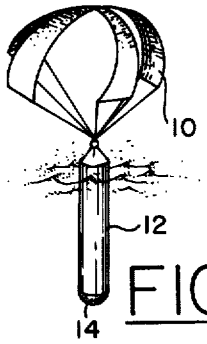

Referring now to the drawings, FIGS. 1a through 1f illustrate the overall deployment sequence of a hydrophone array ejected from an aircraft. Following ejection from the aircraft, a cross parachute 10 unfurls from an open end of a container 12 to control the rate of descent of of the container through the air, as shown in FIG. 1*a*. Once the container enters the water in a near vertical position as shown in FIG. 1*b*, seawater batteries at the closed end of the container are activated. That end of the container is closed by a semispherical lead ballast 14 to assure this near vertical position, and later to establish a 60° glide angle in its descent through the water.

Figure 1C:
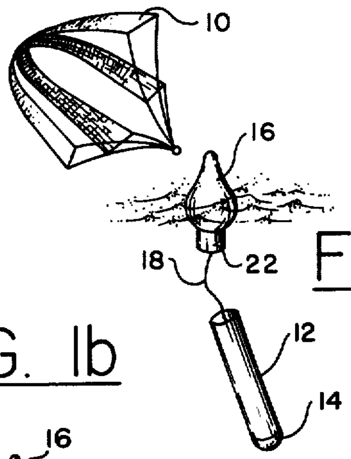

Once the seawater batteries are activated, a squib is fired to release compressed $CO_2$ gas into an inflatable buoy 16 at the open end of the container. As the seawater batteries take on water at the closed end of the container, the container begins to lose buoyancy and descend. Meantime the buoy is inflated, and as it continues to inflate, it causes a release plate (not shown) to buckle and jettison the parachute. Then the inflating buoy withdraws from the package and rises to the surface, as shown in FIG. 1*c*.

Figure 1D:
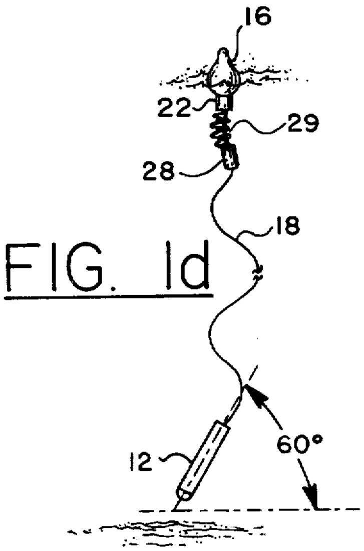
Figure 1E:
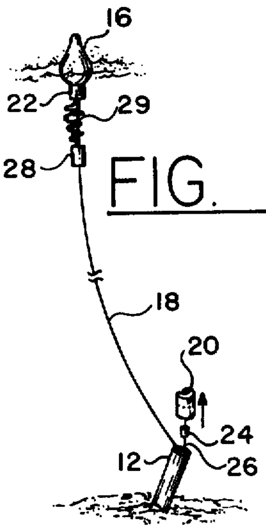
Figure 1F:
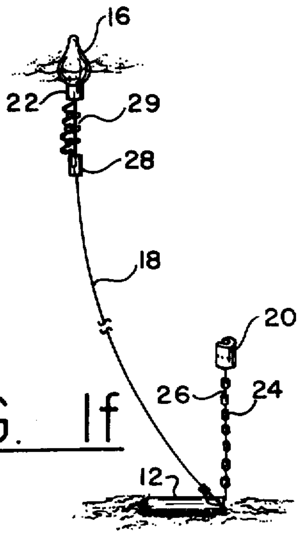

The container descends at a 60° glide angle as shown in FIG. 1*d*, dispensing cable 18 from a cable pack as it goes, until it impacts the ocean floor. Upon impact, an array package ejection switch in the semispherical lead ballast 14 is closed to eject an array package 20 as shown in FIG. 1*e*, lock up the cable 18, and bypass the coiled cable remaining in the pack to permit direct transmission over payed-out cable from the container to an electronic package 22 at the base of the buoy. Syntactic foam or other buoyant material in the array package causes the package to float, and as it ascends, hydrophones 24 connected to a cable 26 are payed out from the array package to erect a vertical hydrophone array as shown in FIG. 1*f*. The cable 26 serves also to transmit signals from the hydrophones to an electronic package in the container. The hydrophone signals are processed and transmitted over the cable 18 to the electronic package at the buoy. From there the signals are transmitted over the air using an antenna erected in the buoy.

For moored hydrophone arrays, it is desirable that the mooring be established automatically as just described, and to adjust the cable 18 to the depth of the ocean. However, the cable should not be too short in order for it to survive the dynamic effects of waves and currents. It should instead be provided with a sufficient scope (ratio of cable length to ocean depth) that is a function of such factors as mooring design, ocean depth and environmental forces that have to be withstood. While all of these factors are known, or can be determined in advance, it is not feasible to predetermine cable length for a desired scope because ocean depths will vary from one mission or site to the next in a range from a few hundred feet to many thousand feet, and it is preferable to use one common system for all missions or site by having cable payed out to whatever depth is required by the particular site, as described, but with sufficient scope. Instead of providing for extra cable to be dispensed from a separate cable pack, usually located at the buoy, it is preferable to dispense extra length of the main cable 18 as it is being payed out. Otherwise extra cable from a separate pack would require that either all of the separate pack by payed out, or that a preset amount be payed out according to the depth anticipated at the site.

Figure 2:
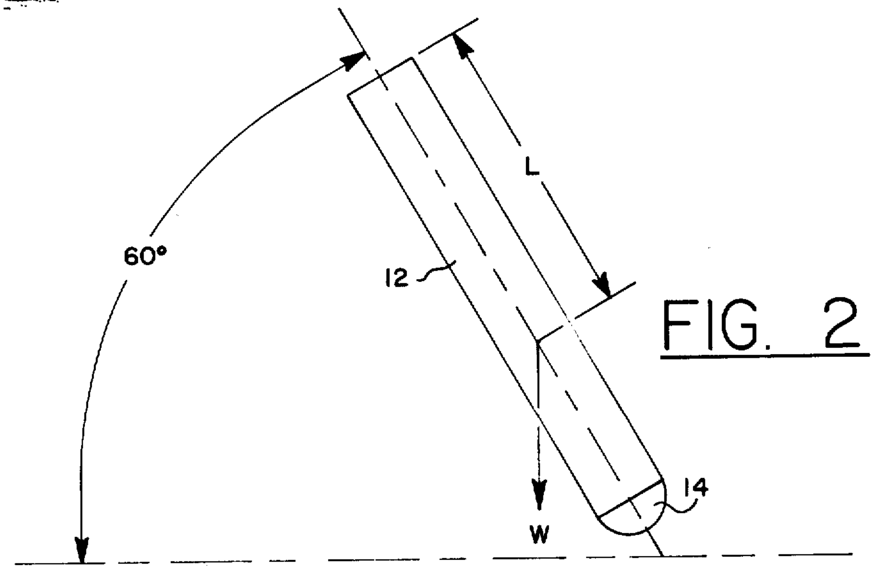
FIG. 2 illustrates a geometry of factors which determine the equilibrium glide angle for an elongated cylindrical body with a semispherical nose.

Extra cable is dispensed in the present system for sufficient mooring scope by causing the container to descend to the ocean floor in a glide path which is significantly greater than the direct vertical path. That is accomplished by making the container 12 in the shape of an elongated cylinder weighted at one end with a semispherical weighted nose. That is best done by forming the container from a hollow cylindrical tube, and closing one end with the semispherical lead ballast 14. Modeling tests have shown that this body will descend in a glide angle of about 60° from the horizontal without the need of any lift surfaces protruding from the container, although such lift surfaces may be provided to modify the glide angle defined by the geometry. This glide angle produces a helical spiral glide path due to container asymetries and to a rotation imparted to the container by Coriolis forces produced by the rotation of the earth. FIG. 2 illustrates the geometry of factors which determine the equilibrium glide angle $\alpha$ for the descending container given by the equation:

$$WL \sin \alpha = M$$

where M is the combined moment of the flow pressure distribution along the body and WL represent the stabilizing mass moment of the body. The spiral glide path thus produced assures that extra cable will be payed out in proportion to the depth of the ocean. Upon impact with the ocean floor, further dispensing of the cable is prevented by a lock-up mechanism as noted hereinbefore.

To power the electronic package 22 at the buoy, the sea batteries are contained in a separate package 28 attached to the buoy and electronic package by an elastic member 29, such as a rubber strap. The cable 18, which includes both signal and power conductors to the electronic package 22 is fastened with excess length to the power package 28, and is connected at intervals to loop around the elastic member 29 to permit the elastic member to stretch as ocean waves cause motion of the buoy. In that manner there is provided a motion isolation system comprised of the battery package 28, which serves as a sea anchor that remains relatively stable in position below the surface of the water, and the elastic member which permits the buoy to move independently of the package 28 while the loops of cable provides the necessary extra length of cable.

Figure 3:
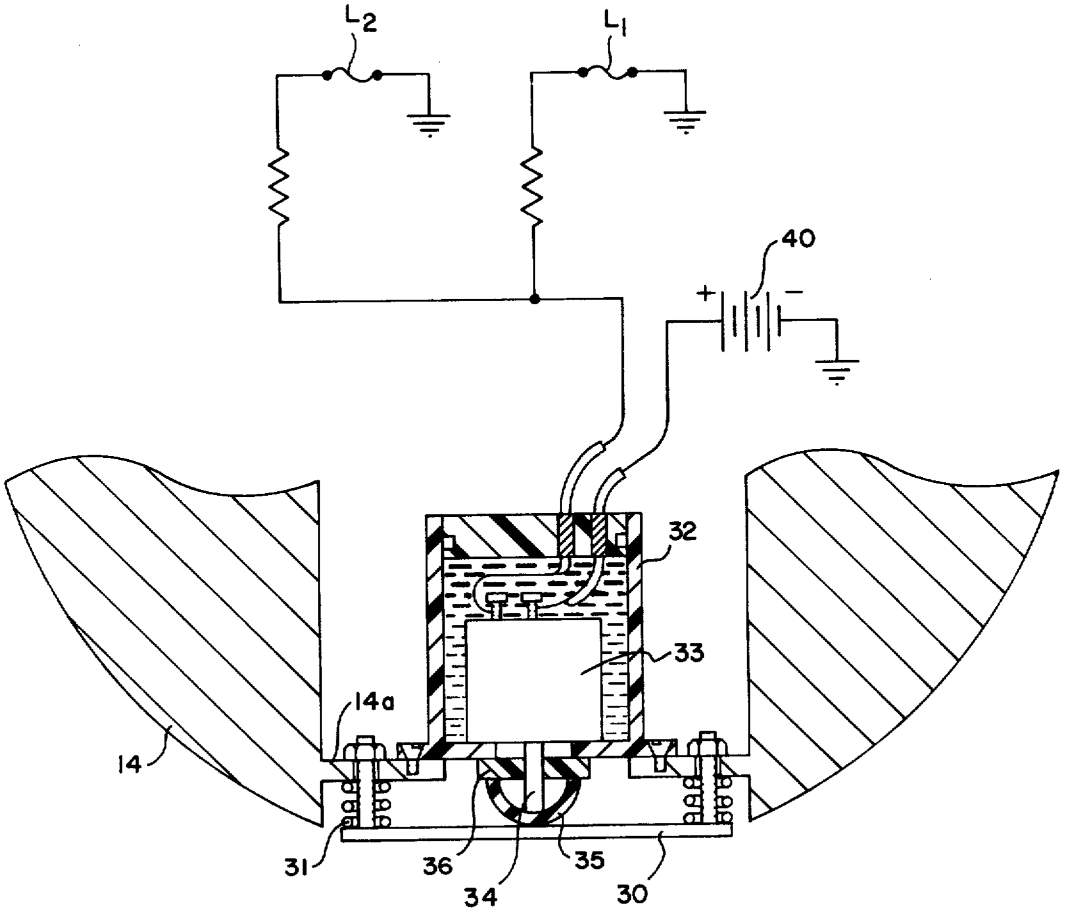
FIG. 3 illustrates an exemplary impact switch for actuating cable lock-up and array package ejection mechanism.

Referring now to FIG. 3, an exemplary impact switch is shown for actuating the cable lock-up mechanism, and to actuate an array package ejection mechanism. An inertia switch could also provide the actuation. A plate 30 is spring biased away from an annular flange 14*a* of the lead ballast 14 by springs 31. Also fastened to the annular flange is a plastic housing 32 containing a microswitch 33. The microswitch has a spring loaded plunger 34 pressing against the plate 30 through a rubber boot 35. The boot is sealed around its edge to a disc 36 which in turn seals the housing. The housing is oil filled to prevent any possibility of arcing between terminals of the microswitch. One terminal is connected by an insulated conductor to the sea batteries of the container and the other is connected to fusible link $L_1$ and $L_2$. The links $L_1$ actuates the cable lock-up mechanism once it fuses, and the link $L_2$ actuates a hydrophone array package ejection mechanism, when it fuses after the link $L_1$ fuses. In operation, the microswitch is internally biased in the open condition, just as the plate 30 is biased away from the flange 14*a* of the lead ballast 14. On impact with the ocean floor, the plate 30 is pushed in against the force of the springs 31, thereby to push in the microswitch plunger 34. That closes the microswitch to provide current to the fusible links $L_1$ and $L_2$.

Figure 4:
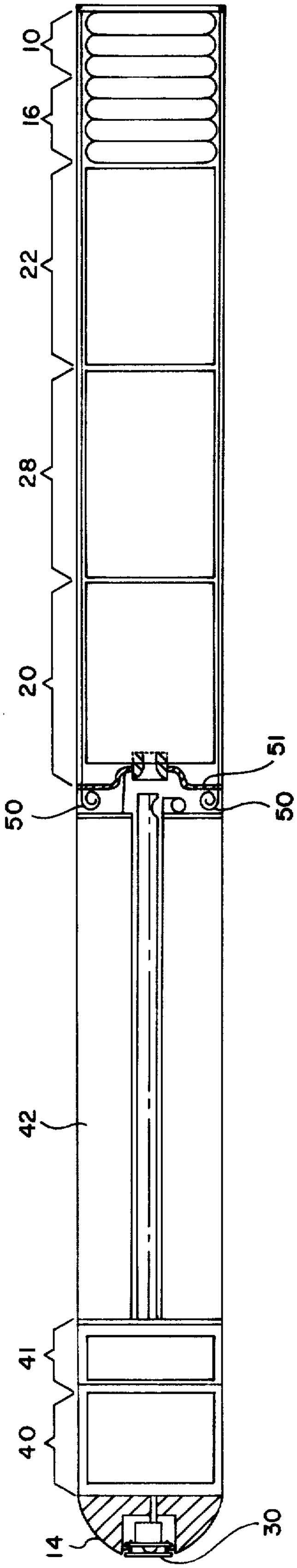
FIG. 4 illustrates an exemplary organization of a hydrophone array to be deployed by an ejected container.

The operation of the array package ejection mechanism will now be described, but first an exemplary organization of a container will be described with reference to FIG. 4. As noted hereinbefore, the container is a hollow cylindrical plastic body having a semispherical lead ballast closing one end. A seawater battery pack 40 next to the lead ballast adds additional ballast to the container at the closed end. Next in order is an electronic package 41 which receives signals from an erected hydrophone array over the cable 26 (FIG. 1*d*) and transmits signals to the surface buoy over the main cable 18. Next to the electronic package is a cable pack 42 for the main cable 18. Its structure and operation is as described in the aforesaid U.S. Pat. No. 4,143,349.

On top of the cable pack is the array package 20, and over the array package is the inflatable buoy 16 and surface electronic package 22. Finally, packed over the inflatable buoy is the parachute 10. The parachute is pulled out by conventional means immediately after the container is ejected from the aircraft. It is connected to the container itself by a harness structure that is jettisoned when the buoy is inflated, as noted hereinbefore. The inflated buoy pulls the electronic package 22 out of the container as the container descends through the water with the hydrophone array package remaining in place.

Figure 5A:
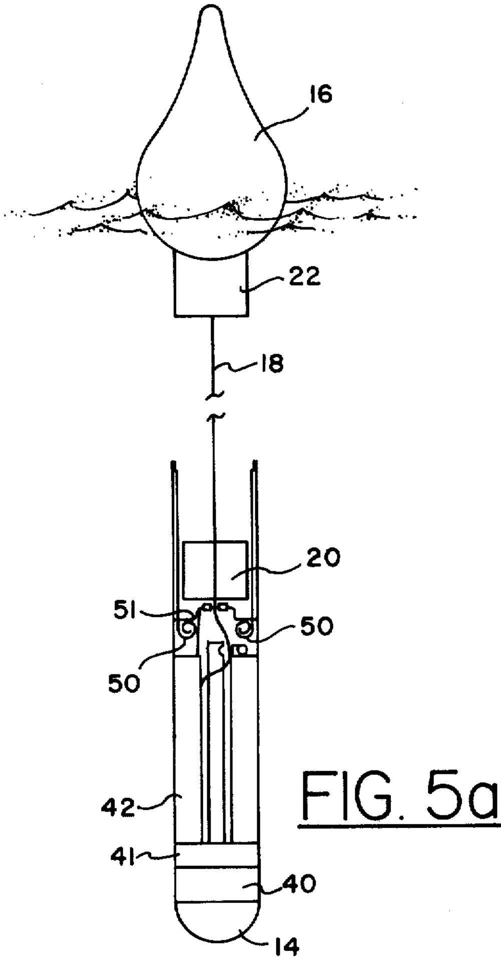
FIGS. 5a–5c illustrate an exemplary mechanism for ejecting a hydrophone array package from a container.
Figure 5B:
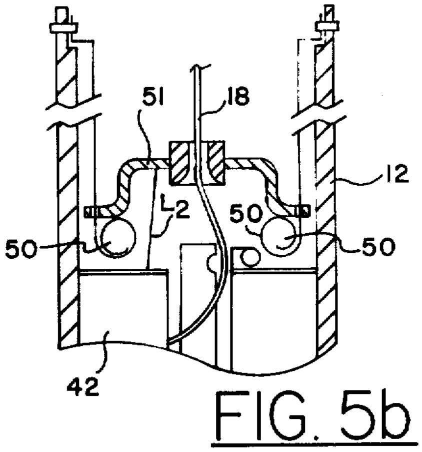

Spring coils 50 spaced around the hydrophone array package have one end attached to the open end of the container. A fairlead plate 51 inserted over the spring coils, and pushed into the container in a position over the battery pack, uncoils the springs as shown more clearly in FIG. 5*b*. The fuse link $L_2$ is connected between the top of the cable pack and the fairlead plate to hold it in place. The array package 20 is then placed over the fairlead plate, followed by the surface electronic package 22, inflatable buoy 16 and parachute (not shown in FIG. 5*a*). Upon impact, the links $L_1$ and $L_2$ are fused, usually while the container is still somewhat upright. Fusing the link $L_1$ (not shown in FIG. 5*a*) actuates the cable lockup mechanism, as indicated schematically in FIG. 5*c*, and fusing the link $L_2$ releases the fairlead plate. The springs 50 then coil up and move the fairlead plate toward the open end of the container, thus ejecting the container package.

Figure 5C:
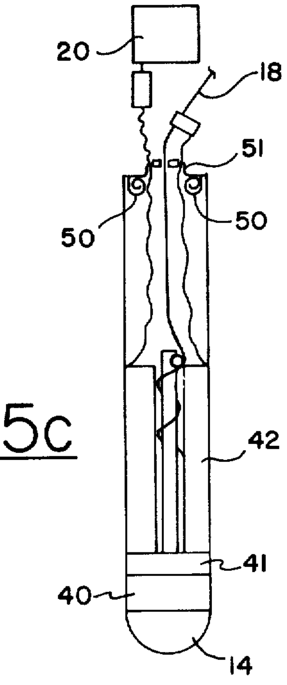
Figure 6:
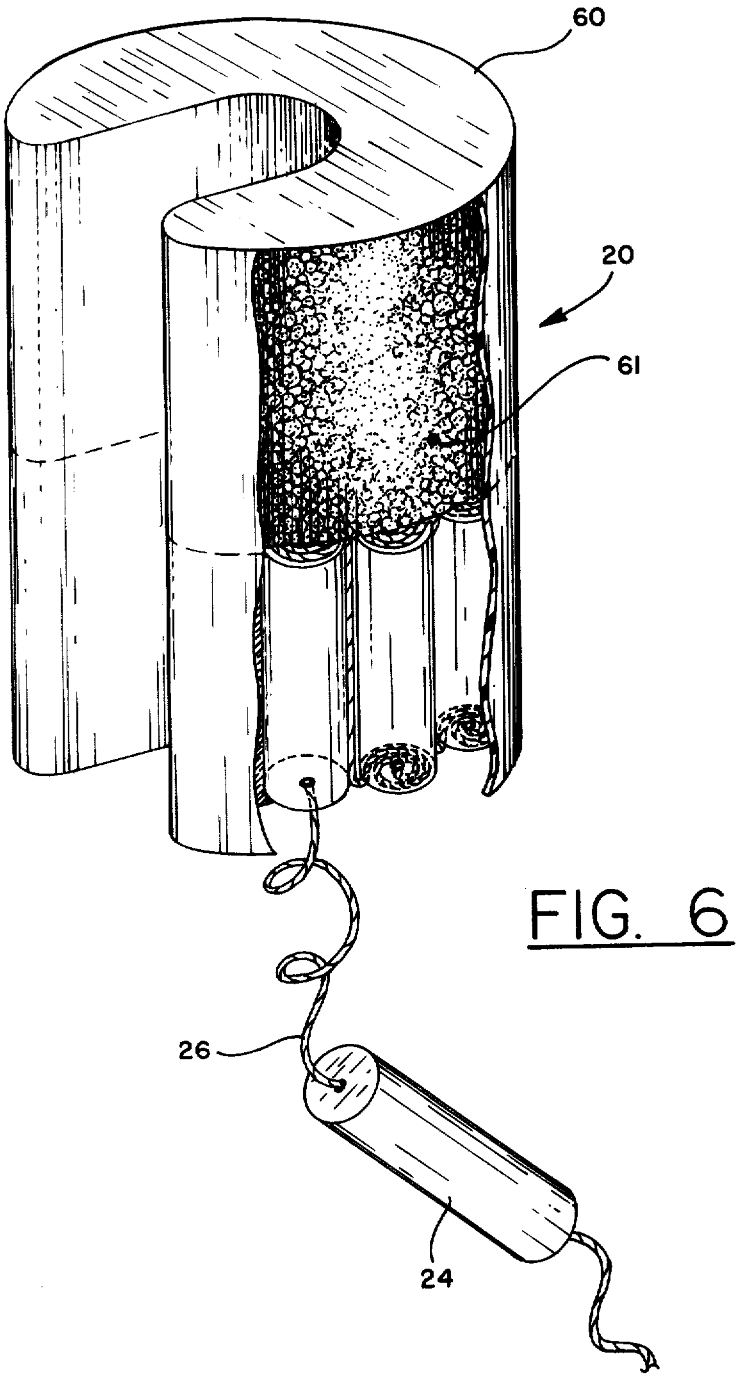
FIG. 6 illustrates an exemplary configuration for a hydrophone array package.

The hydrophone array package is housed in an inverted bucket-like structure 60 shown in FIG. 6. Its side wall is recessed on one side deep past the center to allow passage for the cable 18 to be payed out, and to allow the array package to float away from the main cable once it is ejected. Part of the structure 60 is filled with syntactic foam 61 or other buoyant material so that the structure will float. The rest of the bucket-like structure is filled with the hydrophones 24 and cable 26. The structure 60 and foam 61 thus serve as the float 20 (FIGS. 1*e* and 1*f*) to erect the array deployed from the structure 60, as it rises once it is ejected from the container as shown in FIG. 5*c*. The hydrophones fall out as the cable is payed out while the float rises.

Although particular embodiments of the invention have been described and illustrated herein, it is recognized that modifications and variations may readily occur to those skilled in the art. It is therefore intended that the claims be interpreted to cover such modifications and variations.

The embodiments of the invention in which an exclusive property or privilege is claimed are described as follows:

1. A system comprising a surface buoy, cable and sensor array for deploying said sensor array from a mooring weight on the ocean floor, said cable being connected at its upper end to said surface buoy, and at its lower end to said mooring weight, said system further comprising a container for said array and cable, said container having a hollow elongated body weighted at one end, thereby to descend to the ocean floor at an acute glide angle from the horizontal and to carry said array while paying out said cable, said acute glide angle establishing a glide path greater than the vertical distance from said surface buoy to said ocean floor, thereby to pay out cable of sufficient scope to withstand dynamic effects of waves and currents on said surface buoy once said container reaches the ocean floor, said container further having means for locking the lower end of payed out cable to said container, means for ejecting said array from said container, upon said container reaching the ocean floor, and means for connecting said array to said container whereby said container functions as the mooring weight on the ocean floor for said array.

2. A system as defined in claim 1 wherein said ejection means is comprised of an array buoy connected to one end of said array opposite the end thereof connected to said container and impact means in said container responsive to impact of said container with the ocean floor for ejecting said array buoy from said container.

3. A system as defined in claim 2 wherein said array is in a package packed into said container through an open end opposite said weighted end, and wherein said impact means includes ejection spring means, said array package being packed against the force of said ejection spring means, and further includes releasable means for holding said array package within said container against the force of said ejection spring means, and means for releasing said releasable means upon impact of the container with the ocean floor.

4. A system as defined in claim 3 wherein said releasable means is comprised of a fusible tie-down link to hold said array package within said container, and said releasing means is comprised of an electrical switch closed on impact of said container with the ocean floor for applying current to said fusible link.

5. A system as defined in claim 1 wherein said surface buoy has a mass attached thereto by an elastic member which mass functions as a suspended anchor that remains substantially stable in the water above the ocean floor while ocean waves cause said surface buoy to move up and down relative to the ocean floor, and wherein said cable is attached to both said surface buoy and said mass with a length of cable therebetween greater than the length of said unexpanded elastic member, thereby to isolate motion of said surface buoy from said cable and array below said mass.

6. A system as defined in claim 5 wherein said surface buoy has attached directly thereto an electronic package connected to said buoy through said payed out cable for transmitting radio signals over the air and said mass suspended in the water is comprised of a battery pack for said transmitting electronic package.

7. A system for deploying a hydrophone array moored to the ocean floor and connected to a surface buoy by a cable extending from the ocean floor to said surface buoy, comprising a container dropped into the water to descend to the ocean floor, said container having a hollow cylindrical shape closed at one end by a mass, said container having stored within it a package containing said array, a pack of said cable and said surface buoy, said cable being connected at one end to said surface buoy, and the other end to said container and said array, said container being open at its end opposite the closed end to permit said surface buoy to be ejected upon entering the water, and to permit the cable to be payed out while said container descends to the ocean floor, and means for ejecting said array package from said container upon impact of the container with the ocean floor.

8. A system as defined in claim 7 wherein said hydrophone array is comprised of a plurality of hydrophones connected to said container and said payed out cable at different distances by a second cable, and said array package is comprised of a bucket-like container partially filled with buoyant material to cause said bucket-like container to float, and wherein said hydrophones and second cable are stored in said bucket-like container, whereby said hydrophones and second cable are payed out as said bucket-like container rises in the water to erect said array.

9. A system as defined in claim 8 wherein said means for ejecting said array package includes ejection spring means, said array package being stored in said hollow cylindrically shaped container against the force of said ejection spring means, and further includes releasable means for holding said array package within said hollow cylindrically shaped container, and impact means for releasing said releasable means upon impact of the hollow cylindrically shaped container with the ocean floor.

10. A system as defined in claim 9 wherein said releasable means is comprised of a fusible tie-down link to hold said array package within said container, and said impact means is comprised of an electrical switch which is closed on impact for applying current to said fusible link.

* * * * *